US011951736B2

(12) United States Patent
Hudson et al.

(10) Patent No.: US 11,951,736 B2
(45) Date of Patent: Apr. 9, 2024

(54) THERMAL REGULATION IN LONG INKJET PRINTHEAD

(71) Applicant: Memjet Technology Limited, Dublin (IE)

(72) Inventors: Michael Hudson, North Ryde (AU); David Burke, North Ryde (AU); Qing Chen, North Ryde (AU); Graeme Lowe, North Ryde (AU); Jason Mark Thelander, North Ryde (AU); Ellaine Munton, North Ryde (AU)

(73) Assignee: Memjet Technology Limited, Dublin (IE)

( * ) Notice: Subject to any disclaimer, the term of this patent is extended or adjusted under 35 U.S.C. 154(b) by 44 days.

(21) Appl. No.: 17/847,048

(22) Filed: Jun. 22, 2022

(65) Prior Publication Data

US 2022/0410565 A1 Dec. 29, 2022

Related U.S. Application Data

(60) Provisional application No. 63/214,105, filed on Jun. 23, 2021.

(51) Int. Cl.

| | |
|---|---|
| ***B41J 2/045*** | (2006.01) |
| ***B41J 2/145*** | (2006.01) |
| ***B41J 2/175*** | (2006.01) |

(52) U.S. Cl.
CPC .......... *B41J 2/04531* (2013.01); *B41J 2/145* (2013.01); *B41J 2/175* (2013.01)

(58) Field of Classification Search
CPC ... B41J 2/04531; B41J 2/14; B41J 2/18; B41J 2/145; B41J 2/175; B41J 2202/20; B41J 2002/14362; B41J 2202/21; B41J 2202/08; B41J 2002/14419
See application file for complete search history.

(56) References Cited

U.S. PATENT DOCUMENTS 10,239,316 B2 * 3/2019 Thelander .............. B41J 2/2103

* cited by examiner

*Primary Examiner* — An H Do
(74) *Attorney, Agent, or Firm* — Garson & Gutierrez, PC

(57) ABSTRACT

An inkjet printing system includes: (a) an inkjet printhead having a rigid elongate manifold with first and second parallel ink supply channels extending along a length of the manifold between respective ink ports positioned at opposite ends thereof; and a plurality of printhead chips mounted to a lower surface of the manifold, the ink supply channels supplying ink to the printhead chips via ink outlets defined in the lower surface. One end of the manifold has a first ink inlet port for the first ink supply channel and an ink outlet port for the second ink supply channel. The other end of the manifold has a first ink outlet port for the first ink supply channel and a second ink inlet port for the second ink supply channel. An ink delivery system is configured to flow ink along the first and second channels in opposite directions.

20 Claims, 5 Drawing Sheets

THERMAL REGULATION IN LONG INKJET PRINTHEAD

CROSS REFERENCE TO RELATED APPLICATIONS

This application claims priority to and the benefit of U.S. Provisional Patent Application No. 63/214,105, entitled THERMAL REGULATION IN LONG INKJET PRINTHEAD, filed on Jun. 23, 2021, the disclosure of which is incorporated herein by reference in its entirety for all purposes.

FIELD OF THE INVENTION

This invention relates to thermal regulation in inkjet printheads. It has been developed primarily to provide a more uniform temperature profile along pagewide printheads, particularly those having a thermally conductive ink manifold.

BACKGROUND OF THE INVENTION

The Applicant has developed a range of Memjet® inkjet printers as described in, for example, WO2011/143700, WO2011/143699 and WO2009/089567, the contents of which are herein incorporated by reference. Memjet® printers employ one or more stationary inkjet printheads in combination with a feed mechanism which feeds print media past the printhead in a single pass. Memjet® printers therefore provide much higher printing speeds than conventional scanning inkjet printers.

Pagewide printheads are typically based on a liquid crystal polymer (LCP) manifold, as described in, for example, U.S. Pat. No. 7,347,534. Printhead chips are bonded to a surface of the LCP manifold and ink is delivered to the printhead chips from ink supply channels extending along the length of the manifold.

Whilst LCP is a satisfactory choice of material for A4 printheads, having a CTE similar to silicon, it typically lacks the required rigidity to manufacture longer printheads (e.g. A3 printheads). U.S. Pat. No. 10,293,609 describes a four-channel pagewide printhead having an ink manifold comprised of a metal alloy (e.g. Invar). An Invar manifold advantageously provides the structural rigidity required to fabricate longer printheads, such as A3 printheads. However, metals are more thermally conductive than polymers and such printheads, therefore, have less uniform temperature profiles during printing than printheads having polymer ink manifolds. A non-uniform temperature profile along the length of the printhead may affect print quality since some inkjet nozzles will receive hotter ink than other inkjet nozzles, consequently resulting in differences in ink viscosity and, ultimately, ejected droplet sizes.

It would therefore be desirable to provide printing systems having a more uniform temperature profile in pagewide inkjet printheads, especially long printheads (e.g. >200 mm printheads) having a relatively thermally conductive ink manifold in contact with ink.

SUMMARY OF THE INVENTION

In a first aspect, there is provided an inkjet printing system comprising:

(a) an inkjet printhead comprising:

a rigid elongate manifold having at least first and second parallel ink supply channels extending along a length of the manifold between respective ink ports positioned at opposite first and second ends of the manifold;

a plurality of printhead chips mounted to a lower surface of the manifold, the first and second ink supply channels supplying ink to the printhead chips via ink outlets defined in the lower surface;

wherein:

the first end of the manifold comprises a first ink inlet port for the first ink supply channel and a second ink outlet port for the second ink supply channel;

the second end of the manifold comprises a first ink outlet port for the first ink supply channel and a second ink inlet port for the second ink supply channel;

(b) a first ink delivery system configured for delivering a first ink to the first ink inlet and flowing said first ink along the first ink supply channel in a first direction; and (c) a second ink delivery system configured for delivering a second ink to the second ink inlet and flowing said second ink along the second ink supply channel in a second direction opposite the first direction.

The inkjet printing system according to the first aspect advantageously flows ink in opposite directions through longitudinal ink supply channels extending along a length of a pagewide printhead. By arranging ink flow in opposite directions, improved thermal regulation along the length of the printhead is achieved compared to conventional arrangements having unidirectional ink flow for all ink supply channels along the length of the printhead.

Preferably, the manifold is comprised of a thermally conductive material.

Preferably, the thermally conductive materially is in contact with ink.

Preferably, the thermally conductive material is a metal or a metal alloy.

Preferably the first and second inks are of a same or a different type (e,g. different colors).

Preferably, the manifold has at least first, second, third and fourth parallel ink supply channels extending along a length thereof.

Preferably, ink ports and ink delivery systems corresponding to the first, second, third and fourth ink supply channels are configured to flow ink therethrough in alternately opposite directions. Alternatively, the ink ports and ink delivery systems corresponding to the first, second, third and fourth ink supply channels may be configured to flow ink therethrough in pairwise opposite directions.

Preferably, the plurality of printhead chips comprises a set of butting printhead chips arranged in a row.

Preferably, each printhead chip receives a plurality of different inks from a plurality of different ink supply channels.

In some embodiments the printhead comprises two rows of printhead chips. Typically, each ink supply channel contains a different colored ink, and each printhead chip is configured for printing two different colors of ink.

In a second aspect, there is provided a method of regulating temperature in an inkjet printhead having a rigid elongate manifold comprising at least first and second parallel ink supply channels extending along a length thereof and a plurality of printhead chips receiving ink from said first and second ink supply channels, said method comprising the steps of:

flowing a first ink in a first direction along the first ink supply channel and delivering said first ink to at least some of the printhead chips; and flowing a second ink in a second direction along the second ink supply channel and delivering said second ink to at least some of the printhead chips, wherein the second direction is opposite the first direction, thereby regulating temperature in the inkjet printhead.

Preferred aspects of the first aspect are, of course, equally applicable to the second aspect.

As used herein, the term "ink" is taken to mean any printing fluid, which may be printed from an inkjet printhead. The ink may or may not contain a colorant. Accordingly, the term "ink" may include conventional dye-based or pigment-based inks, infrared inks, fixatives (e.g. pre-coats and finishers), 3D printing fluids, solar inks, functional fluids and the like. Where reference is made to fluids or printing fluids, this is not intended to limit the meaning of "ink" herein.

As used herein, the term "mounted" includes both direct mounting and indirect mounting via an intervening part.

BRIEF DESCRIPTION OF THE DRAWINGS

Embodiments of the present invention will now be described by way of example only with reference to the accompanying drawings, in which.

DETAILED DESCRIPTION OF THE INVENTION

Figure 1:
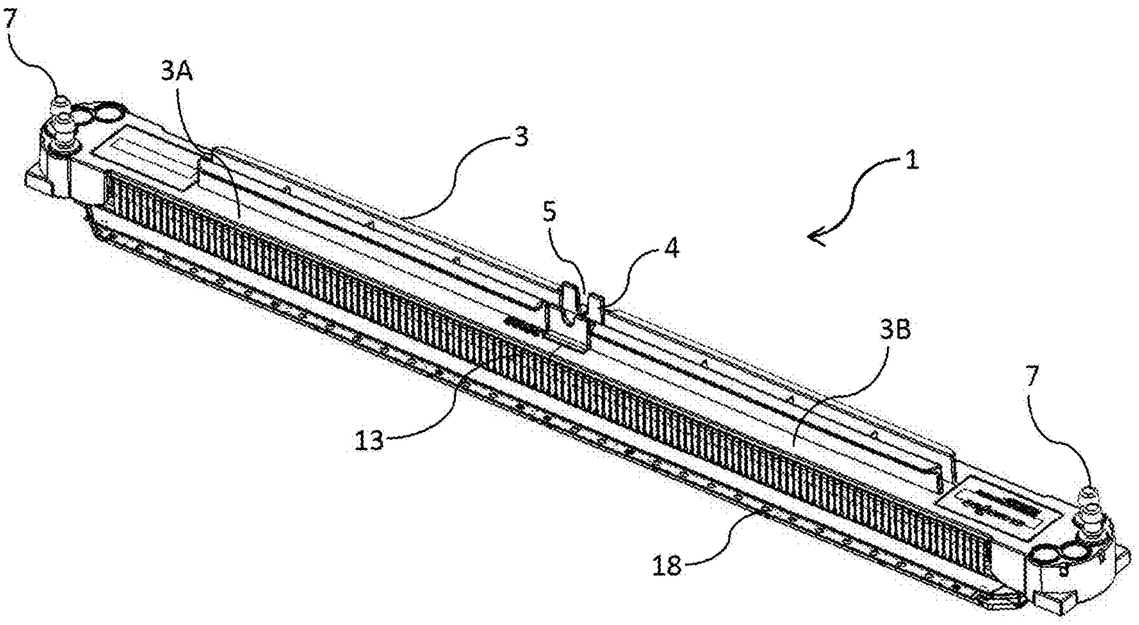
FIG. 1 is a front perspective view of an inkjet printhead.

Referring to FIGS. 1 to 4, there is shown an inkjet printhead 1, as described in U.S. Pat. No. 10,293,609 (the contents of which are incorporated herein by reference), in the form of a replaceable printhead cartridge for user insertion in a print module, such as the print module described in U.S. Pat. No. 10,967,638, the contents of which are incorporated herein by reference. The printhead 1 is a four-channel printhead for optimally printing full-color CMYK inks. However, it will be appreciated that the printhead may have any number of channels, such as 2, 3, 4, 5, 6, 7 or 8 channels.

The printhead 1 comprises an elongate molded plastics casing 3 having a first casing part 3A and a second casing part 3B positioned at either side of a central locator 4. The central locator 4 has an alignment notch 5 for positioning the printhead cartridge 1 relative to a print module. The first and second casing parts 3A and 3B are biased towards each other and the central locator 4 by means of a spring clip 6 engaged between the first and second casing parts (see FIG. 4). The two-part casing 3 in combination with the spring clip 6 enables the casing to expand longitudinally, at least to some extent, to accommodate a degree of longitudinal expansion in a main body 17 of the printhead 1. This arrangement minimizes stress or bowing of the main body 17 of the printhead 1 during use.

Ink connectors 7 connected to respective multichannel fluid couplings 8 protrude upwards through openings at opposite ends of the casing 3 (only two ink connectors shown at each end in FIG. 1). The ink connectors 7 are configured for coupling with complementary fluid couplings (not shown) supplying ink to and/or from the printhead 1.

The printhead 1 receives power and data signals via opposite rows of electrical contacts 13, which extend along respective sidewalls of the printhead. The electrical contacts 13 are configured to receive power and data signals from complementary contacts of a printer (not shown) or print module and deliver the power and data to printhead chips 70 via a PCB.

Figure 2:
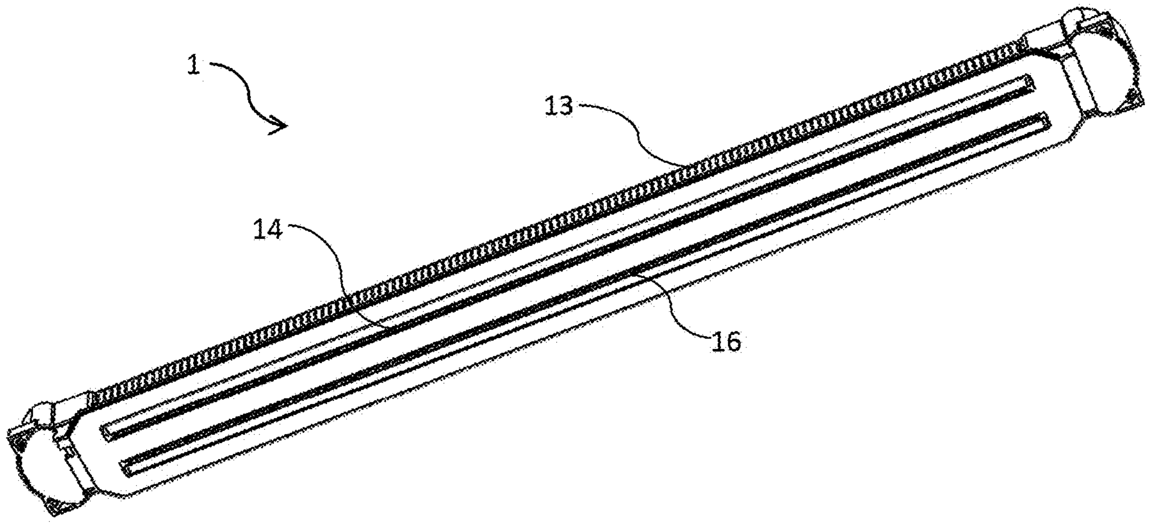
FIG. 2 is a bottom perspective of the printhead.

As shown in FIG. 2, the printhead 1 comprises a first row 14 and a second row 16 of printhead chips for printing onto print media (not shown) passing beneath the printhead. Each row of printhead chips is configured for printing two colors of ink, such that the printhead 1 is a full color pagewide printhead capable of printing four ink colors (CMYK). The printhead 1 is generally symmetrical about a longitudinal plane bisecting the first row 14 and the second row 16 of printhead chips, notwithstanding different ink colors that may be used in the printhead.

Figure 3:
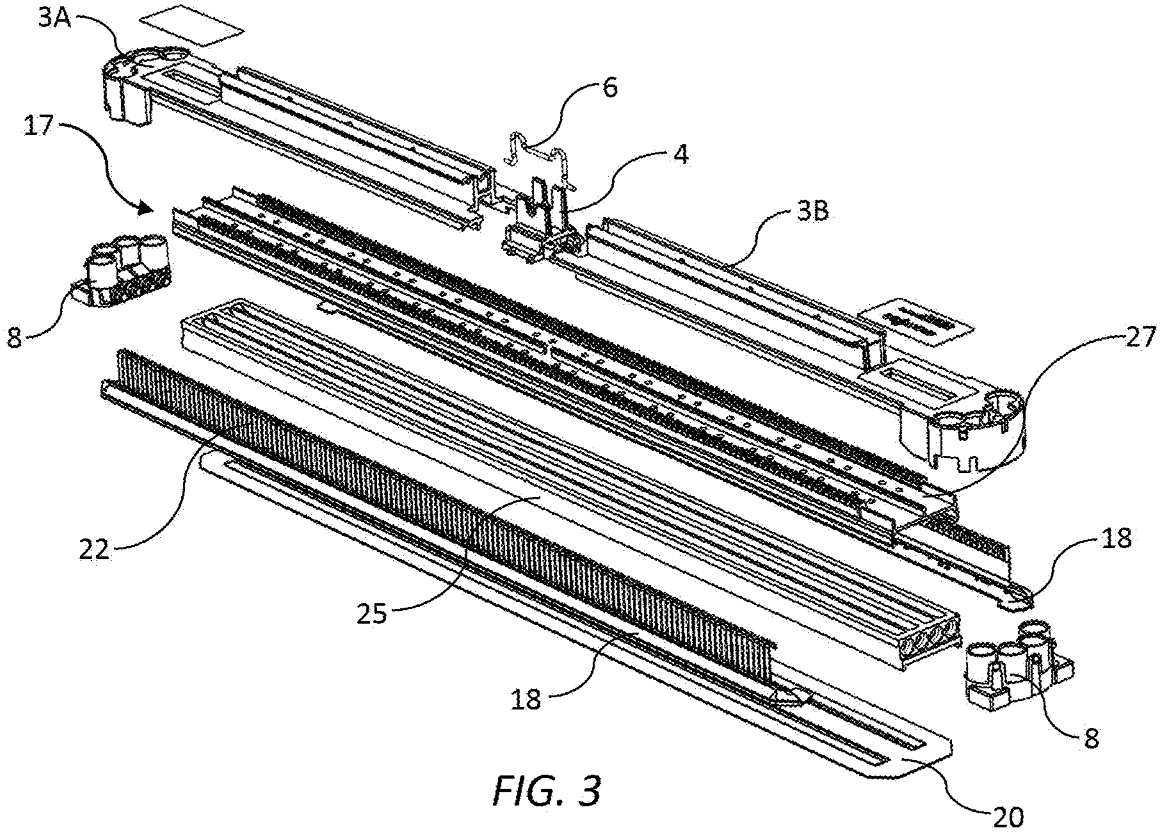
FIG. 3 is an exploded perspective of the printhead.
Figure 4:
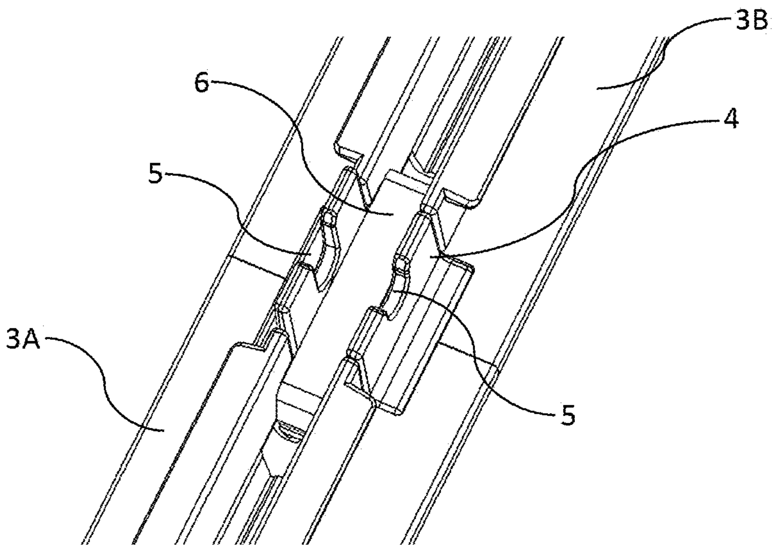
FIG. 4 is a magnified view of a central portion of a casing of the printhead.

In the exploded perspective shown in FIG. 3, it can be seen that the main body 17 forms a rigid core of the printhead 1 for mounting various other components. In particular, the casing 3 is snap-fitted to an upper part of the main body 17; the multichannel fluid couplings 8 (enshrouded by the casing 3) are connected to opposite ends of the main body; a pair of PCBs 18 are attached to a lower part of the main body (which are in turn covered by a shield plate 20); and a plurality of leads 22 (which define the electrical contacts 13) are mounted to opposite sidewalls of the main body.

Figure 5:
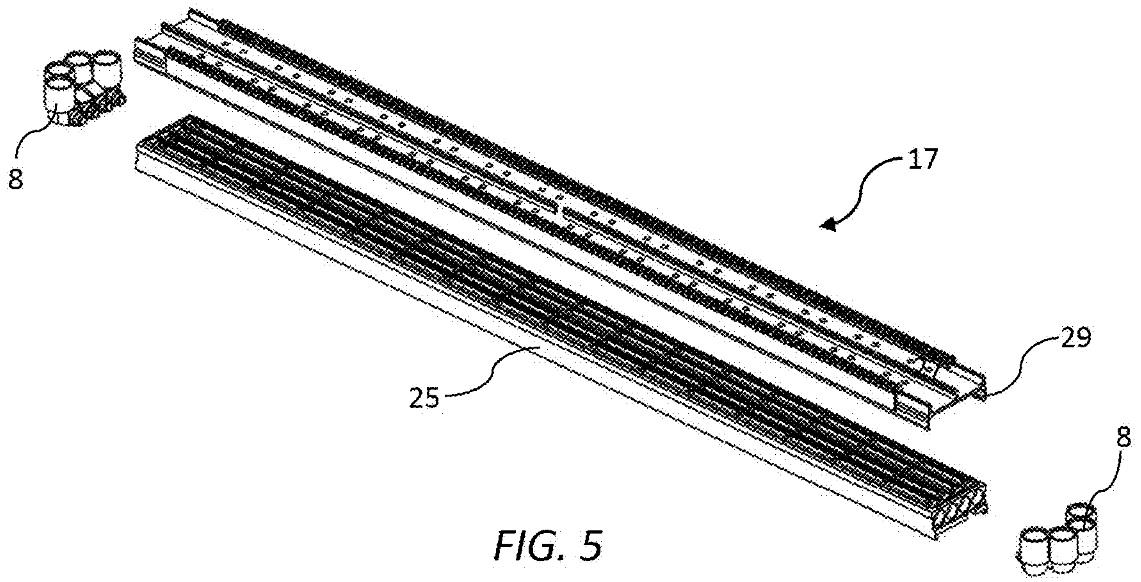
FIG. 5 is an exploded perspective of a main body of the printhead with multichannel fluid couplings.

Referring to FIG. 5, the main body 17 is itself a two-part machined structure comprising an elongate manifold 25 and a complementary cover plate 27. The manifold 25 functions as a carrier having a unitary lower surface for mounting both the first and second rows 14 and 16 of printhead chips. The manifold 25 is received between a pair of opposed flanges 29, which extend downwardly from opposite longitudinal sides of the cover plate 27. The flanges 29 are configured for snap-locking engagement with complementary snap-locking features 26 of the manifold 25 to form the assembled main body 17.

The manifold 25 and cover plate 27 are formed of a metal alloy material having excellent stiffness and a relatively low coefficient of thermal expansion (e.g. Invar). In combination, the manifold 25 and cover plate 27 provide a stiff, rigid structure at the core of the printhead 1 with minimal expansion along its longitudinal axis. As foreshadowed above, the casing 3 is configured so as not to constrain any longitudinal expansion of the main body 17 and thereby minimizes bowing of the printhead during use. Accordingly, the printhead 1 may be provided as an A4-length printhead or an A3-length printhead. It is an advantage of the present invention that a single pagewide printhead may be configured up to A3-length (i.e. from 200 mm up to 300 mm).

Figure 6:
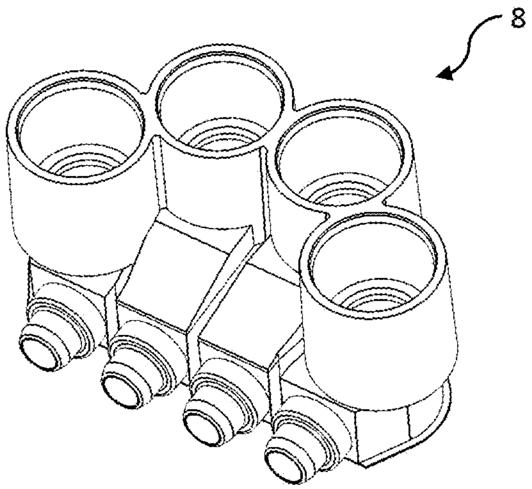
FIG. 6 is a perspective of a fluid coupling.

FIG. 6 shows in isolation one of the multichannel fluid couplings 8, which is designed to transfer four colors of ink through a 90-degree angle for vertical coupling of the printhead 1 to, for example, a complementary fluid coupling of a print module, whilst ensuring that four fluid connectors can be geometrically accommodated within the space constraints of the printhead and its surrounds. Furthermore, the multichannel fluid coupling 8 is designed to equalize any pressure drops as ink flows therethrough, as explained in U.S. Pat. No. 10,369,792, the contents of which are incorporated herein by reference.

Figure 7:
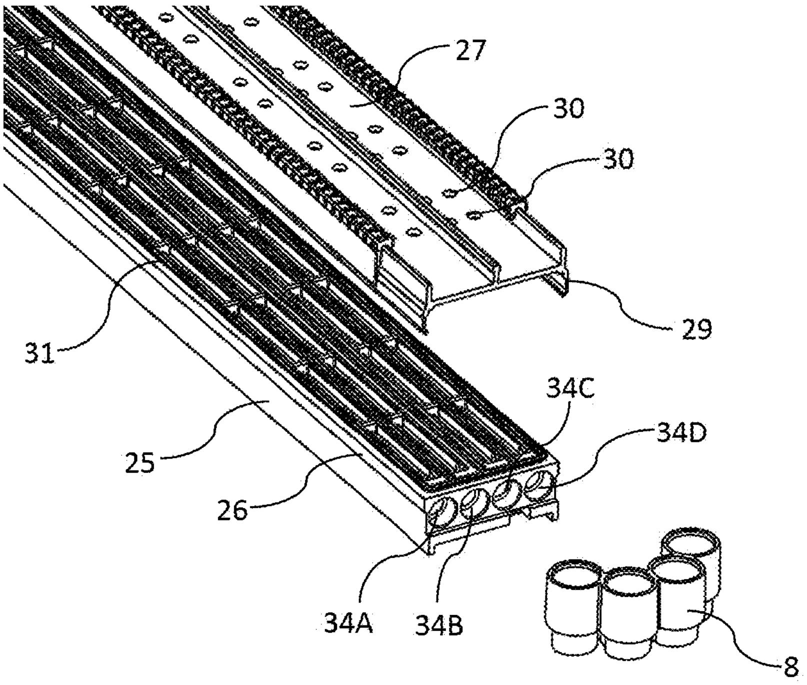
FIG. 7 is a magnified exploded perspective of an end of the main body with one fluid coupling removed.

FIG. 7 is a magnified view of a first end of the manifold 25 and cover plate 27 together with a respective multichannel fluid coupling 8. It will be seen that the cover plate 27 has a plurality of vent holes 30 spaced apart along its length, which are open to atmosphere so as to allow free flexing of a flexible film 31 attached to an upper part of the manifold 25, as described in U.S. Pat. No. 10,293,609.

The multichannel fluid coupling 8 is connected to four ink ports 34 corresponding to four ink supply channels extending along the length of the manifold 25. However, in contrast with the arrangement described in U.S. Pat. No. 10,293,609, the multichannel fluid coupling 8 serves as both inlet and outlet couplings for the manifold 25. Typically, two of the ink ports 34A and 34C are ink inlet ports and two of the ink ports 34B and 34D are ink outlet ports. In this way, ink flows through ink supply channels 40 of the manifold 25 in opposite directions, typically in alternatingly in opposite directions.

Figure 8:
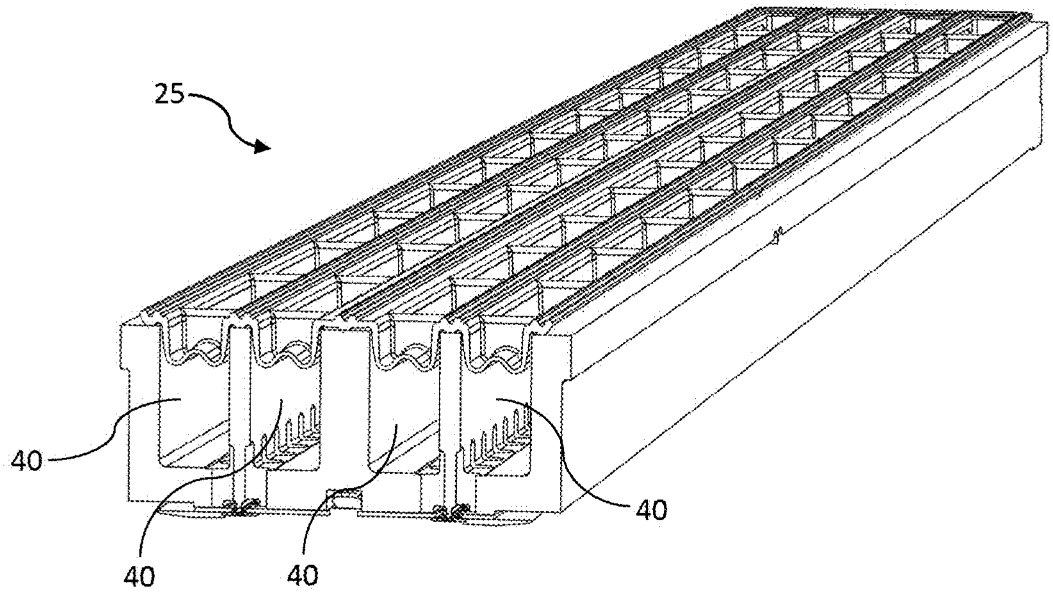
FIG. 8 is a sectional perspective of an ink manifold.

Referring now to FIG. 8, the four ink supply channels 40 of the manifold extend longitudinally along a length thereof. Two ink supply channels 40 are supplied with ink from respective ink inlet ports 34A and 34C at one end of the manifold 25; the other two ink supply channels are supplied with ink from ink inlet ports at the opposite end of manifold. As foreshadowed above, both ends of the manifold 25 have ink inlet ports and ink outlet ports, thereby enabling ink flow in opposite directions through the manifold.

Figure 9:
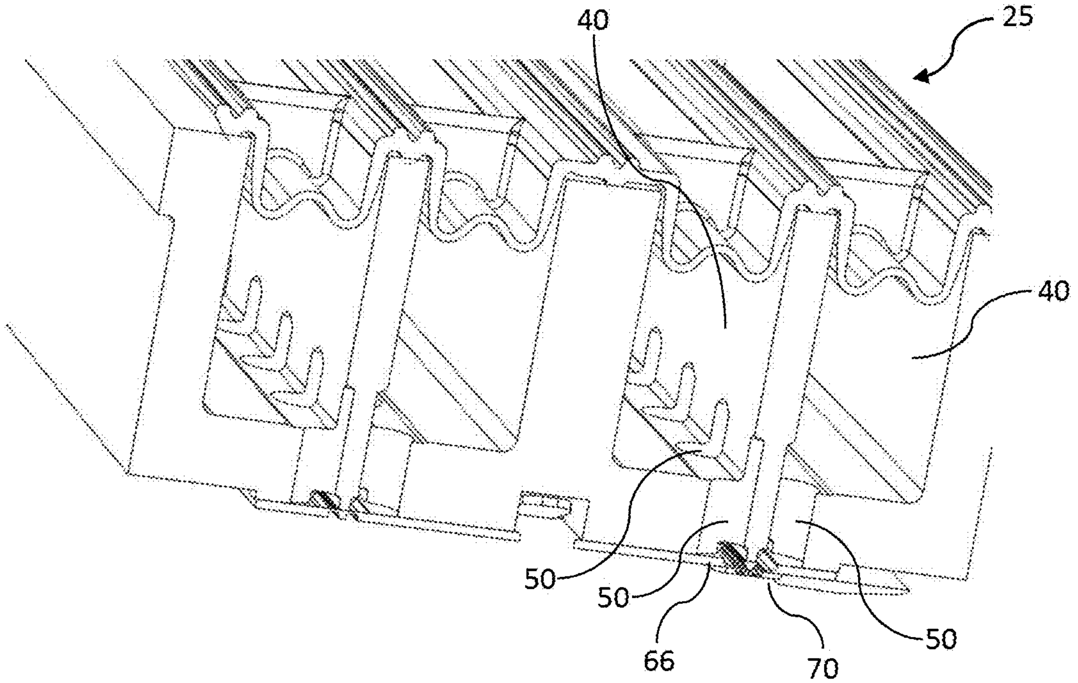
FIG. 9 is a magnified sectional perspective of the ink manifold.
Figure 10:
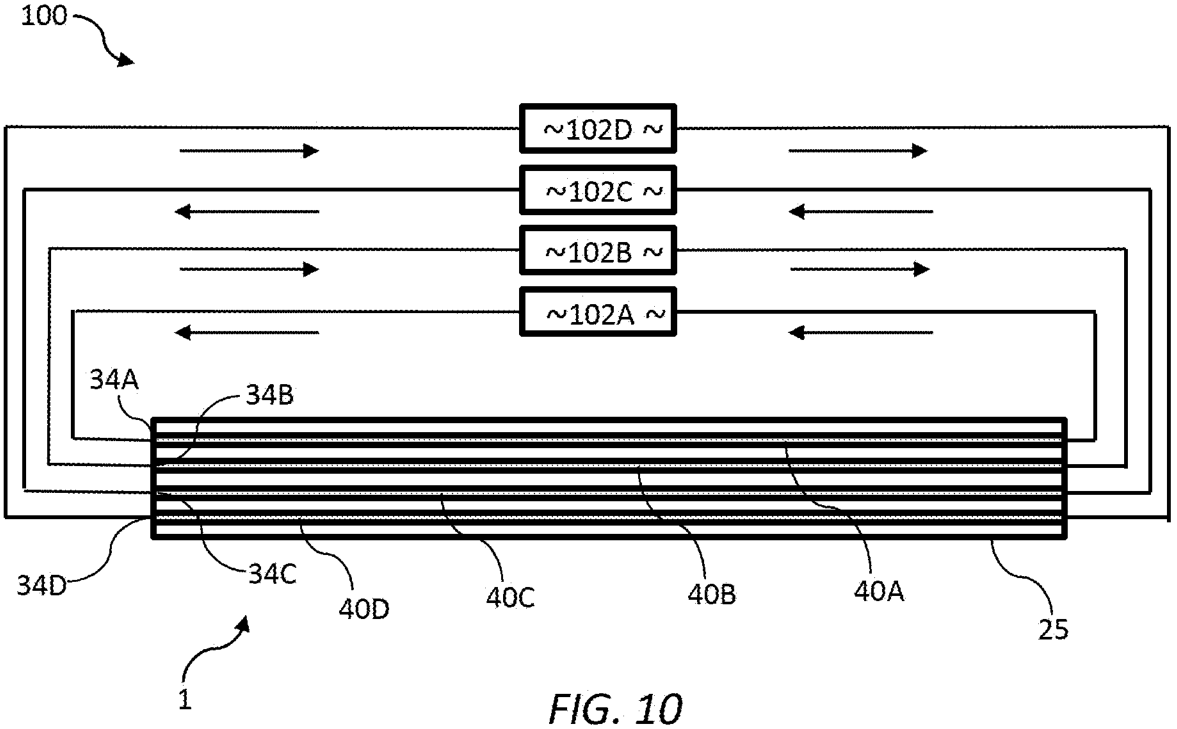
FIG. 10 is a schematic view of a printing system employing the inkjet printhead shown in FIG. 1.

1. As best shown in FIG. 9, a plurality of through-holes 50 are defined at a base of each ink supply channel 40 for supplying ink to two parallel rows of printhead chips 70 via an apertured shim 66 adhesively bonded to a lower surface of the manifold 25. Typically, in use, the first row 14 and the second row 16 of printhead chips 70 each receives two inks from a respective pair of ink supply channels 40. Therefore, the printhead 1 may be configured for CMYK redundant printing using two nozzle rows in each printhead chip 70 per color. Alternatively, the printhead 1 may be configured for high-speed monochrome printing whereby a same colored ink (e.g. black) is supplied to all four ink supply channels 40. Other printing configurations will be readily apparent to the person skilled in the art.
2. Referring to FIG. 10, there is shown schematically a printing system 100 employing the printhead 1 having an alternating ink flow arrangement. Each of the four ink supply channels 40 of the manifold 25 has a dedicated ink delivery system 102A, 102B, 102C and 102D for delivering ink thereto. The ink delivery systems 102 may be of any suitable type for delivering a circulating ink flow through one of the ink supply channels 40 of the manifold 25. Typically, each ink delivery system 102 comprises one or more components selected from the group consisting of: pumps, valves, sensors, intermediary ink tank, flow restrictors, pressure dampeners etc. Suitable ink delivery systems are described in, for example, U.S. Pat. Nos. 10,427,414; 10,369,802 and 10,252,540, the contents of each of which are incorporated herein by reference.

Ink delivery systems 102A and 102C supply inks in an anticlockwise direction as shown in FIG. 10, such the ink ports 34A and 34C at a first end of the manifold 25 are both ink inlet ports. Conversely, ink delivery systems 102B and 102D supply inks in an clockwise direction as shown in FIG. 10, such the ink ports 34B and 34D at the first end of the manifold 25 are both ink outlet ports. Thus, the ink supply channels 40 extending along a length of the manifold 25 have alternating ink flow directions.

The printing system 100 assists in regulating temperature along the length of the printhead. In prior art printing systems, as described in U.S. Pat. No. 10,293,609, the ink flow through the manifold 25 is unidirectional, the printhead have an inlet end and an outlet end. During printing, the manifold 25 tends to increase in temperature due to heat dissipated from printhead chips 70. With unidirectional ink flow, the ink towards the inlet end of the manifold 25 tends to be cooler than the ink towards the outlet end of the manifold, since the ink will tend to absorb heat from the manifold as it flows through the ink supply channels 40 towards the outlet end. Consequently, ink viscosity and ejected droplet sizes for all color channels may differ from one end of the printhead compared to the opposite end. Typically, ejected droplet sizes tend to increase towards the outlet end of the printhead as the ink becomes hotter and the viscosity is reduced.

However, in the arrangement shown in FIG. 10 with ink flow in alternating opposite directions through neighboring ink supply channels 40, the longitudinal temperature profile of the manifold 25 is more uniform and any variances in droplet size tend to be equalized across the four color channels used in contone printing. For example, if ink supply channels 40A and 40C have hotter ink towards the right-hand side of the printhead 1 as shown in FIG. 10, then ink supply channels 40B and 40D will tend to have cooler ink towards the right-hand side, such that the average ink temperature across all four ink channels is generally equalized along the length of the printhead. Accordingly, the present invention provides a means by which print quality may be improved in printheads having a thermally conductive ink manifold.

It will, of course, be appreciated that the present invention has been described by way of example only and that modifications of detail may be made within the scope of the invention, which is defined in the accompanying claims.

The invention claimed is:

1. An inkjet printing system comprising:

(a) an inkjet printhead comprising:

a rigid elongate manifold having at least first and second neighboring parallel ink supply channels extending along a length of the manifold between respective ink ports positioned at opposite first and second ends of the manifold;

a plurality of printhead chips mounted to a lower surface of the manifold, the first and second ink supply channels supplying ink to the printhead chips via ink outlets defined in the lower surface;

wherein:

the first end of the manifold comprises a first ink inlet port for the first ink supply channel and a second ink outlet port for the second ink supply channel;

the second end of the manifold comprises a first ink outlet port for the first ink supply channel and a second ink inlet port for the second ink supply channel;

(b) a first ink delivery system configured for delivering a first ink to the first ink inlet and flowing said first ink along the first ink supply channel in a first direction; and (c) a second ink delivery system configured for delivering a second ink to the second ink inlet and flowing said second ink along the second ink supply channel in a second direction opposite the first direction.

2. The inkjet printing system of claim 1, wherein the manifold is comprised of a thermally conductive material.

3. The inkjet printing system of claim 2, wherein the thermally conductive materially is in contact with ink.

4. The inkjet printing system of claim 2, wherein the thermally conductive material is a metal or a metal alloy.

5. The inkjet printing system of claim 1, wherein the first and second inks are of a same or a different type.

6. The inkjet printing system of claim 1, wherein the manifold has at least first, second, third and fourth parallel ink supply channels extending along a length thereof.

7. The inkjet printing system of claim 6, wherein ink ports and ink delivery systems corresponding to the first, second, third and fourth ink supply channels are configured to flow ink therethrough in alternately opposite directions.

8. The inkjet printing system of claim 6, wherein ink ports and ink delivery systems corresponding to the first, second, third and fourth ink supply channels are configured to flow ink therethrough in pairwise opposite directions.

9. The inkjet printing system of claim 1, wherein the plurality of printhead chips comprises a set of butting printhead chips arranged in a row.

10. The inkjet printing system of claim 9, wherein the printhead comprises two rows of printhead chips.

11. The inkjet printing system of claim 1, wherein each printhead chip receives a plurality of different inks from a plurality of different ink supply channels.

12. The inkjet printing system of claim 11, wherein each ink supply channel contains a different colored ink, and each printhead chip is configured for printing two different colors of ink.

13. A method of regulating temperature in an inkjet printhead having a rigid elongate manifold comprising at least first and second neighboring parallel ink supply channels extending along a length thereof and a plurality of printhead chips receiving ink from said first and second ink supply channels, said method comprising the steps of:

flowing a first ink in a first direction along the first ink supply channel and delivering said first ink to at least some of the printhead chips; and flowing a second ink in a second direction along the second ink supply channel and delivering said second ink to at least some of the printhead chips, wherein the second direction is opposite the first direction, thereby regulating temperature in the inkjet printhead.

14. The method of claim 13, wherein the manifold is comprised of a thermally conductive material.

15. The method of claim 14, wherein the thermally conductive material is a metal or a metal alloy.

16. The method of claim 13, wherein the printhead has a length of at least 200 mm.

17. The method of claim 13, wherein the first and second inks are of a same or a different type.

18. The method of claim 13, wherein the plurality of printhead chips comprises a set of butting printhead chips arranged in a row.

19. The method of claim 13, wherein each printhead chip receives the first and second inks from the first and second ink supply channels.

20. The method of claim 13, wherein the printhead comprises two rows of butting printhead chips.

* * * * *